US008589380B2

(12) United States Patent
Waldo et al.

(10) Patent No.: US 8,589,380 B2
(45) Date of Patent: *Nov. 19, 2013

(54) APPARATUS AND METHOD FOR THE AUTOMATIC DISCOVERY OF CONTROL EVENTS FROM THE PUBLICATION OF DOCUMENTS

(75) Inventors: Patrick Blackmon Waldo, Bethesda, MD (US); Andrew B. Waldo, Bethesda, MD (US)

(73) Assignee: Decernis, LLC, Washington, DC (US)

( * ) Notice: Subject to any disclaimer, the term of this patent is extended or adjusted under 35 U.S.C. 154(b) by 467 days.

This patent is subject to a terminal disclaimer.

(21) Appl. No.: 12/632,951

(22) Filed: Dec. 8, 2009

(65) Prior Publication Data

US 2010/0153360 A1 Jun. 17, 2010

Related U.S. Application Data

(60) Provisional application No. 61/120,680, filed on Dec. 8, 2008.

(51) Int. Cl.
*G06F 7/00* (2006.01)

(52) U.S. Cl.
USPC .......................... 707/710; 707/741; 707/738

(58) Field of Classification Search
None
See application file for complete search history.

(56) References Cited

U.S. PATENT DOCUMENTS

| 6,442,589 | B1 | 8/2002 | Takahashi et al. |
| 2001/0056359 | A1 | 12/2001 | Abreu |
| 2002/0156810 | A1 | 10/2002 | Holland et al. |
| 2005/0165743 | A1 | 7/2005 | Bharat et al. |
| 2006/0112040 | A1 | 5/2006 | Oda |
| 2006/0247944 | A1 | 11/2006 | Calusinski, Jr. et al. |
| 2007/0150513 | A1 | 6/2007 | Vanden Heuvel et al. |
| 2007/0271235 | A1 | 11/2007 | Frank et al. |
| 2009/0204415 | A1 | 8/2009 | Baiera |
| 2010/0153360 | A1 | 6/2010 | Waldo et al. |
| 2010/0274691 | A1 | 10/2010 | Hammad et al. |
| 2011/0068915 | A1 | 3/2011 | Wakefield, III |

OTHER PUBLICATIONS

International Search Report (PCT/ISA/210) dated Mar. 4, 2010, including PCT/ISA/220 and PCT/ISA/237 (Eight (8) pages).
Kjersti Aas et al., "Text Categorisation: A Survey.", Report No. 941, Jun. 1, 1999, pp. 1-37, XP055047638.
Extended European Search Report dated Dec. 12, 2012 (Nine (9) pages).
Corresponding International Search Report dated Aug. 14, 2012 (three (3) pages).
Written Opinion of the International Searching Authority dated Aug. 14, 2012 (eight (8) pages).

*Primary Examiner* — Apu Mofiz
*Assistant Examiner* — Thu Nga Nguyen
(74) *Attorney, Agent, or Firm* — Crowell & Moring LLP

(57) ABSTRACT

A method and system for discovering a control event from electronically published documents is provided, in which a control program on a computer identifies electronically published documents stored in a plurality of network servers which potentially contain control events relevant to the control of goods and/or services, the control events being identified by reference to a user interest database containing user interest identifiers. Identified documents are analyzed by a classification program to determine whether control events are present, referring to a control event database. A control event classification is assigned to documents determined to contain at least one discovered control event, the assigned control event classification and information identifying the associated document is stored in a classification database, and a report of discovery of documents containing control events is be provided to a user. The report may includes a link to the control event classification and/or its associated document.

20 Claims, 17 Drawing Sheets

Home | Product Safety | Food and Consumer Products | Decernis News

Search

Search Site

Advanced Search...

Navigation

☐ North America
☐ European Union
☐ Latin America
☐ Asia Pacific

301 →

300 →

302 →

Search

| Publication Date | Region | Country | Agency | Type | Citation | Journal Source | Module | Topic | Subtopic | Details |
|---|---|---|---|---|---|---|---|---|---|---|
| 2008/11/28 | NA | United States | Environmental Protection Agency | PROPOSED RULES | Protection of Stratospheric Ozone: the 2009 Critical Use Exemption from the Phaseout of Methyl Bromide, 72421-72440 [E8-28328] | Federal Register | Product Safety | Environmental | Air | Details |
| 2008/11/25 | European Union | European Union | European Chemicals Agency | Registry | Registry of intentions for Annex XV dossiers | European Chemicals Agency | Product Safety | Dangerous - Toxic Substances | REACH | Details |
| | European Union | European Union | European Commission | Regulation | Regulation (EC) No 1102/2008 of the European Parliament and of the Council of 22 October 2008 on the banning of exports of metallic mercury and certain mercury compounds and mixtures and the safe storage of metallic mercury (1) | EurLex | Product Safety | Dangerous - Toxic Substances | Controls | Details |
| 2008/11/14 | European Union | European Union | European Commission | Act | Council Joint Action 2008/858/CFSP of 10 November 2008 in support of the Biological and Toxin Weapons Convention (BTWC), in the framework of the implementation of the EU Strategy against the Proliferation of Weapons of Mass Destruction | EurLex | Product Safety | Import and Export | Chemical Weapons | Details |
| 2008/11/13 | European Union | European Union | European Commission | | National Emission Standards for | | | | | |

FIG. 3

Registry of intentions for Annex XV dossiers

| Publication Date | Region | Country | Agency | Type | Citation | Journal Source | Module | Topic | Subtopic |
|---|---|---|---|---|---|---|---|---|---|
| Nov 25, 2008 12:00 AM | European Union | European Union | European Chemicals Agency | Registry | Registry of intentions for Annex XV dossiers | European Chemicals Agency | Product Safety | Dangerous - Toxic Substances | REACH |

Substances found:

| Chemical | CAS | Pages |
|---|---|---|
| Pyrene | 129-00-0 | 1 |
| Phosphate | 14265-44-2 | 1 |
| Abamectine | 65195-55-3 | 1 |
| Tris(nonylphenyl) phosphite | 26523-78-4 | 1 |
| Distillates, coal tar | 65996-92-1 | 1 |
| Trixylyl phosphate | 25155-23-1 | 1 |
| Coal tar pitch | 65996-93-2 | 1 |
| Chloroform | 67-66-3 | 1 |
| Clothianidin | | 1 |
| Mercaptoacetate | 68-11-1 | 1 |
| Indium phosphide | 22398-80-7 | 1 |
| Di-tert-butyl peroxide | 110-05-4 | 1 |

Search
Search Site
Advanced Search...

Navigation
- North America
- European Union
  - European Commission
  - European Food Safety Authority
  - European Chemical Agency
    - registry-of-intentions
- Latin America
- Asia Pacific Home | Product Safety | Food and Consumer Products | Decernis News

Registry of intentions for Annex XV dossiers

- Annex XV dossiers submitted
- Withdrawn intentions

| Dossier intended by | Substance identification and composition | | | Impurities (where relevant for harmonised C&L, SVHC or restriction) | | | Types of Annex XV dossier | Date of intention | Expected submis |
|---|---|---|---|---|---|---|---|---|---|
| | IUPAC name (and/or chemical name) | EC number (and/or CAS number) | Purity range | IUPAC name (and/or chemical name) | EC number (and/or CAS number) | Concentration range | | | |
| Current intentions | | | | | | | | | |
| Netherlands | abamectine | (71751-41-2) | | | | | CL | 07/08/2008 | 30/11/2008 |
| Netherlands | acequinocyl | (57960-19-7) | | | | | CL | 07/08/2008 | 31/12/2008 |
| Netherlands | trioxylylphosphate | 246-677-8 | | | | | CL | 07/08/2008 | 30/09/2008 |
| COM | residues (coal tar), pitch distn. | 295-507-9 | | | | | SVHC | 27/06/2008 | 01/12/2008 |
| COM | Distillates (coal tar), heavy oils | 292-607-4 | | | | | SVHC | 27/06/2008 | 01/12/2008 |
| COM | Distillates (coal tar), heavy oils, pyrene fraction | 295-304-5 | | | | | SVHC | 27/06/2008 | 01/12/2008 |
| COM | Distillates (coal tar), pitch, pyrene fraction | 295-313-4 | | | | | SVHC | 27/06/2008 | 01/12/2008 |
| COM | coal tar pitch, high temperature | 266-028-2 | | | | | SVHC | 27/06/2008 | 01/12/2008 |

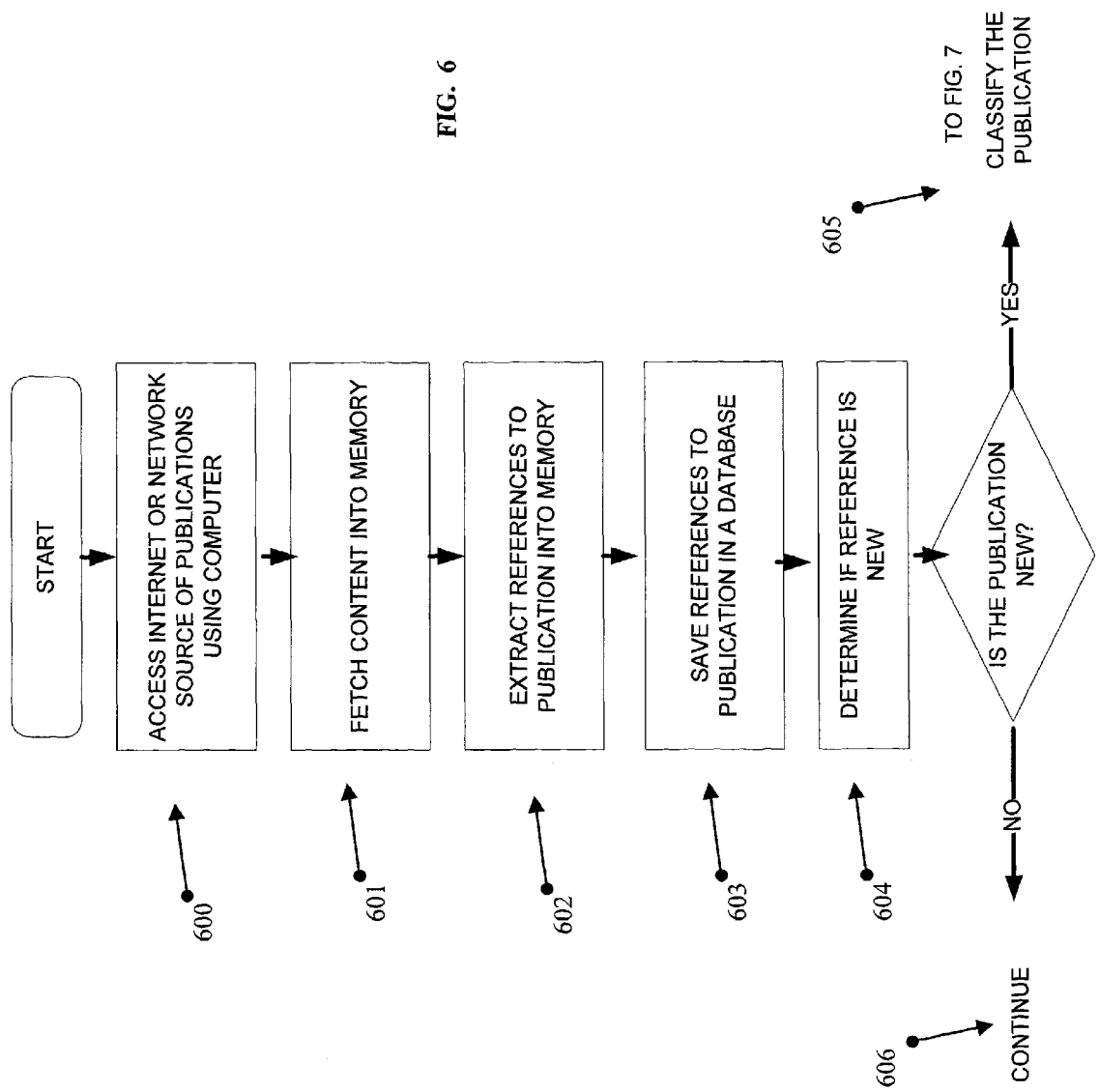

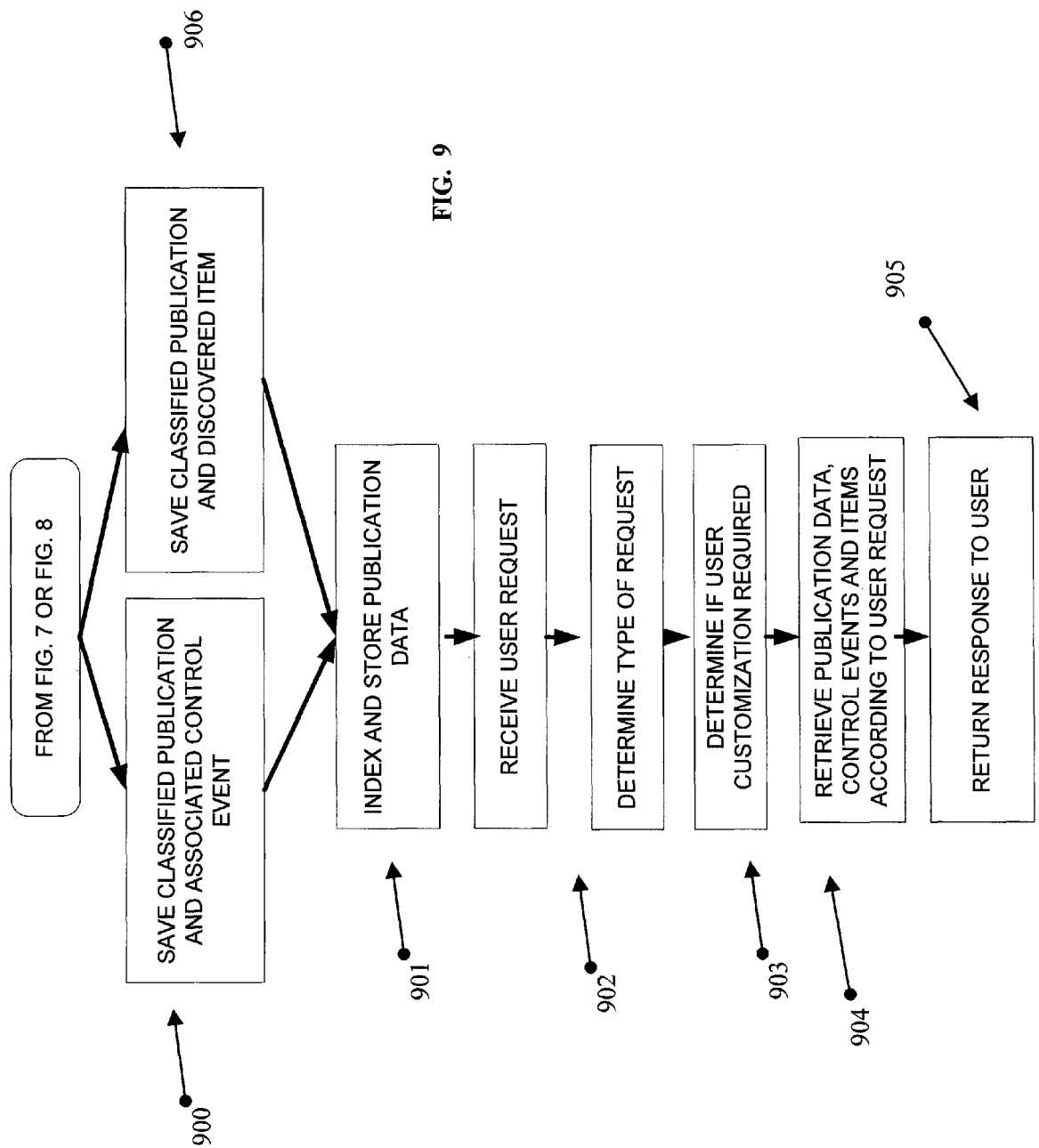

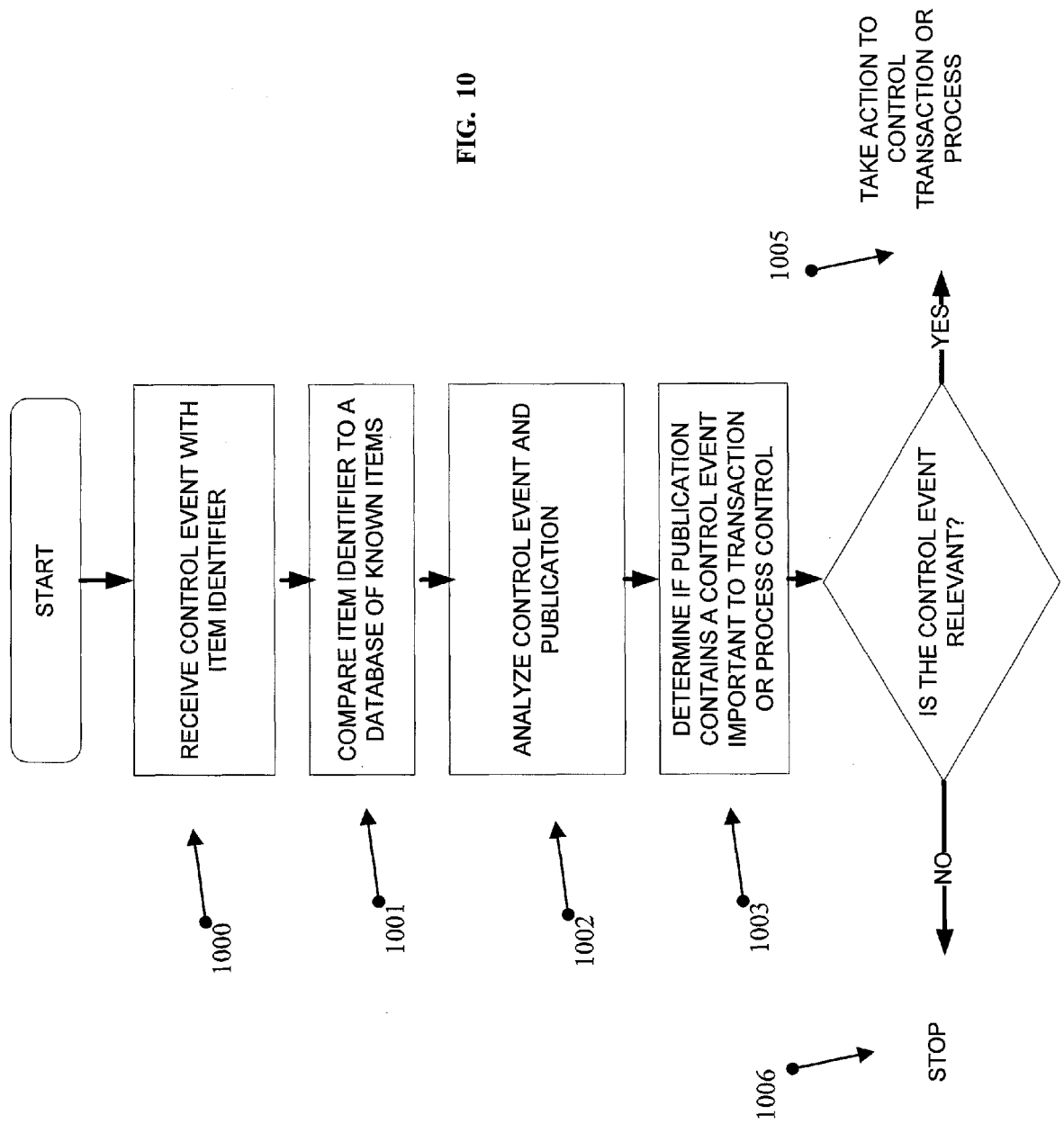

| Country | Region | Cite | Control | Control Category | Control Subcategory |
|---|---|---|---|---|---|
| European Union | EU | Council Directive 91/414/EEC - Amendment Decision 2001/861/EC. Possible inclusion of Laminarin and Naval | Product Safety | Dangerous - Toxic Substances | Pesticides |
| European Union | EU | Council Directive 91/414/EEC - Amendment Decision 2006/1009/EC. Non-inclusion of dimethenamid in Annex I | Product Safety | Dangerous - Toxic Substances | Pesticides |
| European Union | EU | Council Directive 91/414/EEC - Amendment Decision 2007/356/EC. Non-inclusion of trichlorfon in Annex I | Product Safety | Dangerous - Toxic Substances | Pesticides |
| European Union | EU | Council Directive 91/414/EEC - Amendment Decision 2007/379/EC. Non-inclusion of fenitrothion in Annex I | Product Safety | Dangerous - Toxic Substances | Pesticides |
| European Union | EU | Council Directive 91/414/EEC - Amendment Decision 2007/380/EC. Possible inclusion of Candida oleophila st | Product Safety | Dangerous - Toxic Substances | Pesticides |
| European Union | EU | Council Directive 91/414/EEC - Amendment Decision 2007/387/EC. Non-inclusion of dichlorvos in Annex I | Product Safety | Dangerous - Toxic Substances | Pesticides |
| European Union | EU | Council Directive 91/414/EEC - Amendment Decision 2007/389/EC. Non-inclusion of malathion in Annex I | Product Safety | Dangerous - Toxic Substances | Pesticides |
| European Union | EU | Council Directive 91/414/EEC - Amendment Decision 2007/392/EC. Non-inclusion of oxydemeton-methyl in An | Product Safety | Dangerous - Toxic Substances | Pesticides |
| European Union | EU | Council Directive 91/414/EEC - Amendment Decision 2007/393/EC. Non-inclusion of diazinon in Annex I | Product Safety | Dangerous - Toxic Substances | Pesticides |
| European Union | EU | Council Directive 91/414/EEC - Amendment Decision 2007/398/EC. Possible inclusion of ethaboxam in Annex | Product Safety | Dangerous - Toxic Substances | Pesticides |
| European Union | EU | Council Directive 91/414/EEC - Amendment Decision 2007/415/EC. Non-inclusion of carbosulfan in Annex I | Product Safety | Dangerous - Toxic Substances | Pesticides |
| European Union | EU | Council Directive 91/414/EEC - Amendment Decision 2007/416/EC. Non-inclusion of carbofuran in Annex I | Product Safety | Dangerous - Toxic Substances | Pesticides |
| European Union | EU | Council Directive 91/414/EEC - Amendment Decision 2007/417/EC. Non-inclusion of diuron in Annex I | Product Safety | Dangerous - Toxic Substances | Pesticides |
| European Union | EU | Council Directive 91/414/EEC - Amendment Directive 2006/132/EC - Correction: Decision 2007/452/EC. Procyn | Product Safety | Dangerous - Toxic Substances | Pesticides |
| European Union | EU | Decision 2006/1010/EC: Non-inclusion of phosalone in Annex I to Directive 91/414/EEC | Product Safety | Dangerous - Toxic Substances | Pesticides |
| European Union | EU | Decision 2006/131/EC: New active substance thiamethoxam | Product Safety | Dangerous - Toxic Substances | Pesticides |
| European Union | EU | Decision 2006/302/EC: Non-inclusion of methabenzthiazuron in Annex to Directive 91/414/EEC and withdrawal | Product Safety | Dangerous - Toxic Substances | Pesticides |
| European Union | EU | Decision 2006/409/EC: Provisional authorisations granted for the new active substance profoxydim | Product Safety | Dangerous - Toxic Substances | Pesticides |
| European Union | EU | Decision 2006/584/EC: Authorisations granted for the new active substance beflubutamid | Product Safety | Dangerous - Toxic Substances | Pesticides |
| European Union | EU | Decision 2006/966/EC: Non-inclusion of alachlor in Annex I to Council Directive 91/414/EEC | Product Safety | Dangerous - Toxic Substances | Pesticides |
| European Union | EU | Decision 2007/366/EC: Non-inclusion of thiodicarb in Annex I to Council Directive 91/414/EEC | Product Safety | Dangerous - Toxic Substances | Pesticides |

1100 → Country  1101 → Region  1102 → Cite  1103 → Control

```
NOTIFIER|245|0.5660377358491|3.1398326175311.7726374577
PEER|245|0.481132075472|3.173734169211.526985307812
414|245|0.867924528302|1.756319899937|1.524553120211
RAPPORTEUR|245|0.726415094341|2.098378742711.542299993234
CIPAC|245|0.386792452830|3.901972666957|1.509253579744
230|245|0.726415094341|1.877590995050|1.363910374444
PESTICIDE|245|0.566037735851|2.435635600781|1.355683966471
ACTIVE|245|0.971698113208|1.331543846351|1.293858643155
AUTHORISATIONS|245|0.518867924528|2.486350693361|1.290087623911
FINALISED|245|0.443396226415|2.886052096751|1.279664608944
KYPRIANOU|245|0.490566037736|2.570738085641|1.261126796733
MARKOS|245|0.490566037736|2.570738085641|1.261116796733
MITIGATION|245|0.330188679245|3.768441276951|1.244296648055
PLANT|245|0.990566037736|1.236068089921|1.224407070211
INCLUSION|245|0.688679245283|1.773174230921|1.221148291111
PLACING|245|0.820754716981|1.421042168171|1.166327062555
SEASON|245|0.367924528302|3.044522437721|1.120154481811
RMS|245|0.254716981132|4.205655083371|1.071251766522
NONINCLUSION|245|0.273584905661|3.901972666957|1.067520824691
STANDING|245|0.716981132075|1.445236896751|1.036207586355
NONTARGET|245|0.311320754717|3.322154174321|1.034255544844
451|245|0.377358490566|2.734367509421|1.031836796011
DOSSIER|245|0.584905660377|1.756319899371|1.027281450577
IMPLEMENTATION|245|0.688679245283|1.486909593151|1.024003776422
GROUNDWATER|245|0.358490566038|2.827457932491|1.013616994466
AQUATIC|245|0.443396226415|2.324705164101.989869002554
```

FIG. 15

```
dec_2008_902_2_en.txt|165|PLACING|1.2250363518
dec_2008_902_2_en.txt|260|DISPOSAL|1.3512676408
dec_2008_902_2_en.txt|172|1.1438920771
dec_2008_902_2_en.txt|140|PREJUDICE|0.9090244848
dec_2008_902_2_en.txt|245|NOTIFIER|1.7772637457
dec_2008_902_2_en.txt|245|PEER|1.5269853078
dec_2008_902_2_en.txt|414|1.5243531202
dec_2008_902_2_en.txt|245|RAPPORTEUR|1.5242939923
dec_2008_902_2_en.txt|230|1.3639103744
dec_2008_902_2_en.txt|245|PESTICIDE|1.3556839664
dec_2008_902_2_en.txt|245|ACTIVE|1.2938586431
dec_2008_902_2_en.txt|245|AUTHORISATIONS|1.2900876239
dec_2008_902_2_en.txt|245|FINALISED|1.2796646089
dec_2008_902_2_en.txt|245|PLANT|1.2244070702
dec_2008_902_2_en.txt|245|INCLUSION|1.2211482911
dec_2008_902_2_en.txt|245|PLACING|1.1663270625
dec_2008_902_2_en.txt|245|SEASON|1.1201544481
dec_2008_902_2_en.txt|245|NONINCLUSION|1.0675208246
dec_2008_902_2_en.txt|245|STANDING|1.0362075863
dec_2008_902_2_en.txt|451|1.0318367960
dec_2008_902_2_en.txt|245|IMPLEMENTATION|1.0240037764
dec_2008_902_2_en.txt|245|GROUNDWATER|1.0136169946
dec_2008_902_2_en.txt|245|AQUATIC|0.9898690025
dec_2008_902_2_en.txt|256|ORGANISMS|1.4595809330
dec_2008_902_2_en.txt|256|NOTIFIER|1.3082635906
dec_2008_902_2_en.txt|168|USES|0.8890862997
```

APPARATUS AND METHOD FOR THE AUTOMATIC DISCOVERY OF CONTROL EVENTS FROM THE PUBLICATION OF DOCUMENTS

BACKGROUND AND SUMMARY OF THE INVENTION

The present invention discloses an apparatus and method for the automatic discovery of control events from the publication of documents over the Internet or other network.

A document published electronically in the Internet may have an important effect on the control of goods and services delivered in a global economy. Whether proposed or final, a new or modified law, regulation, standard, study, guideline, finding, health alert, product recall, governmental or advisory announcement are all examples of publications that the producer or manufacturer of the good or service must be aware of as soon as possible-if they influence his business or interests. Such a publication represents a critical control event that may influence the producer's or manufacture's actions and business process with regard to the good or service. For instance, if a new regulation is published that restricts the usage of a manufacturer's product or raw materials anywhere in the world, published in any language, the manufacturer's regulatory experts must be made aware of that publication immediately. Similarly if a new toxicological study has found that a substance has an adverse environmental or health effect, the manufacturer has an important managerial duty, potential liability arising from, and economic investment in knowing of such a publication and in responding quickly. Indeed a product recall may be necessary to carry out as a result.

The need to be well informed of relevant control events applicable to producing goods and services in a global economy applies to all actors in a supply chain, whether manufacturer, distributor, customer, service provider or government. Accordingly it would be desirable to provide a system and way to discover automatically relevant information associated with control events that can be passed to all actors in a supply chain. Further it would be highly useful to pass the discovered information as signals to an enterprise system enabling early warning and transaction control.

Systems and methods for personalizing and aggregating news content are well known. An example of such a method is Google News™. Google News™ aggregates and classifies news stories authored by other news publishers in an automatic manner. In contrast, in the present invention is not a news aggregation service but an apparatus and method to discover critical control events relevant to a supply chain using a novel discovery and classification technique, which may be linked to an enterprise system to pass signals and early warning for transaction control of goods and services. Other known methods have defined how to enable the enhancement of reference data taken from a variety of sources. For example, financial markets may receive press releases from companies identified by stock symbol and a variety of other types of information which can be advantageously rendered into a value-added and centralized view through methods previously defined. The present invention does not merely enhance the value of input reference data for which the relevance is known, but rather provides an apparatus and method to discover through classification the relevance of an unknown original publication and then produces information essential to controlling goods or services in a supply chain.

Today the actors in a supply chain have a limited number of options available to them to become informed of publications that represent critical control events: They may: a) manually check relevant web-sites one-by-one; b) subscribe to specialized news publications that summarize the actions taken of importance; c) retain consultants to perform this as a service; d) join trade associations where committees seek to monitor such events; and e) perform searches in one of the major Internet search engines. These are inefficient and involve delay. It would be desirable to have a centralized source of information, rather than relying on checking web sites individually, a labor-intensive activity requiring expert knowledge (for example, to know which web sites are important in a global economy). However, a short-coming of centralized web-searching at present using the major web-search engines is that they are limited in their capability to search across technical and linguistic content. For instance, if the search involves a chemical substance, a search in any of the major engines, including Google™, will return only hits for the English term, "acetic acid," but will not return in the same search any translation such as "acide acétique" (French) or "Essigsäure" (German). If a producer of a good or service dependent on acetic acid searched new regulations or studies, a search using today's search engine would fail to produce hits for the French or German terms without entering each one individually, but to achieve the result the user would have to know in advance the relevant translations for which to search. The same difficulty applies to a search for commodities, e.g., strawberry (English) vs. fragola (Italian) vs. Erdbeere (German). In addition, the same limitation also applies to toxins and diseases. Finally, such web-services not only cannot address multi-lingual searching for publications of relevance to a supply chain, but they also do not classify the relevance of the publications to control events for a supply chain. The present invention provides an apparatus and method to establish a centralized as well as customized information services based on the automatic discovery of publications that must be made known to the producer of a good or service in a global economy.

Other resources are also available to the user: Information services are in wide use by which the user who wishes to be informed of an event may establish personalized alerting of news of interest by storing a query that is run with a frequency defined by the user, often referred to as "clipping services". Lexis-Nexis has an Alert feature that is an example of such a service. The Federal Register also offers an alert service for registered users. However, there are limitations to such services: a) The user must know a priori the relevant search terms and queries that will find a relevant document; b) in a global context the definition of such terms and queries would be complicated by the need to translate the terms of the query across many languages for a given issue; c) the user may need to be aware of and subscribe to many such services in order to obtain the necessary coverage of international subject matter; and d) the user's knowledge to enter a term or query would not be capable of being optimized, improved by, or of including terms used by other experts or by a system that could calculate a more robust selection set from an information source. In brief, the user can easily miss important information given the limitations of today's clipping services.

To achieve centralized information sources across the Internet, Google™ and others have provided for page-ranking algorithms to index and make available web-pages collectively deemed important through a method of voting based on cross-page references. However, if the publication on a given web-site is very new and the need is urgent for the user to know that the publication has been released, there is not enough time for a voting or ranking algorithm based on other links to reference it and thus to rank it highly among many thousands of references in responding to a query by the user of an Internet search engine. In short, publications of high importance and recent release can easily be missed. It would be desirable to have a ranking system based on a broader pool of knowledge which would act in the place of the human expert carrying out and improving on the results possible through current methods, and which would be implemented using artificial intelligence functionality.

With regard to existing artificial intelligence methods, significant research has occurred in the area of text classification by automatic means. Computer-based systems and methods for finding rules of law in text have been defined. Document classifying systems have been developed to build classification decision trees. Further, systems have been invented for automatically and rapidly classifying or declassifying military, intelligence, government, and industrial documents to protect sensitive or classified information. Some of the techniques used in document classification include artificial neural networks, Bayesian learning, decision-tree learning, genetic algorithms, cluster, vector and other statistical techniques, and rule-based analysis. Typically these are applied to documents available to the user or transmitted to the user. For example, a spam filter by automatic means eliminates unwanted emails, or an automatic classification is carried out for a known library of documents into categories. It would be desirable to have an automatic system to search for and discover new publications that can then be passed to such a classification method that produces not only an ontological or hierarchical collection of terms, but more specifically a means to relate those classification outcomes to a system of control events that can then be related to critical control points in a business process.

A control event for the producer of a good or service may be considered by analogy to a system used to achieve food safety developed by the U.S. FDA, called Hazard Analysis and Critical Control Point Principles (HACCP). According to FDA, "HACCP is a management system in which food safety is addressed through the analysis and control of biological, chemical, and physical hazards from raw material production, procurement and handling, to manufacturing, distribution and consumption of the finished product." http://www.cfsan.fda.gov/~comm/nacmcfp.html. The goal of a HACCP strategy is to define all of the critical control points in a process or supply chain that can be applied to prevent or eliminate a food safety hazard. A critical control point is a step at which control can be applied to prevent a food safety hazard. In one embodiment of the present invention, a control event is one relevant to a critical control point and is associated with the publication of one or more documents.

For example, if the manufacturer is engaged in the development and sale of food additives, then a critical control point would include the determination that compliance had been achieved with all relevant requirements of the jurisdictions in which the product was marketed and sold. A newly published regulation or toxicological study would, for example, represent a control event associated with such critical control points in the manufacturing process.

As used in this invention control events are considered generally related to the production of any good or service and are defined as key elements or categorizations of the production of a good or service in a supply chain. Once control events are defined and are mapped to the control points of a specific business or manufacturing process it becomes possible to automatically monitor and identify publications relevant to a particular control event. All subscribers to a centralized information service can then be quickly informed of events that affect the production, marketing, and distribution of the good or service in a defined informational structure.

The automatic identification of control events offered by the system and method of the present invention then can be passed in a structured way as signals to alert the management of a supply chain in the same manner that control signals can be sent by an information system through a network to control a motor. In order to achieve this objective a protocol must be defined for what information and how it is to be sent to the motor and control events serve a similar purpose here with regard to alerting a supply chain.

The apparatus and method of the present invention involves a number of steps. One step is to define by manual or algorithmic methods the source web-sites that correspond to a plan for geographic and subject matter coverage of interest to the actors in a supply chain. These web-sites would be the sources of the publications to be monitored. Four example web-sites of immediate interest to the regulatory compliance of food processors are: The U.S. Federal Register, FDA's web-site of the Center for Food Safety and Applied Nutrition, the European Union, and European Food Safety Authority (EFSA). In an alternative embodiment an existing source of or index to documents in the Internet or in a network could be used as the source of the publications to be examined by the classification process described below.

Based on the plan of coverage, a diverse number of web-sites are monitored on a regular basis by a master control application running on a server computer to identify whether a new publication has been released and its type. For example, the Federal Register would be monitored on a daily basis to identify notices, proposed rules, and final rules as publication types. Taking another instance, the European Food Safety Authority (EFSA) might release a new scientific opinion of the Panel on Food Additives, Flavourings, Processing Aids and Materials in Contact with Food. A master control program routinely accesses each defined Internet or network source and seeks to identify the publications of interest using one or more methods according to the invention that result in a collection of publications or publication references.

The identification of candidate publications of possible interest within a web-site is carried out by one or more methods that include but are not limited to: applications running on the server computer that make a simple examination of each new publication, applications that examine the date of files stored on the target source; applications that include algorithmic methods for the selection of publications, and screening applications running to inspect the web-site based on selection criteria. The step concludes with a set of new candidate publications of possible interest for the time period defined.

Each of the candidate publications is submitted to a classifier application running on a server computer connected to a database containing document elements—for example, word terms, fragments, phrases, spatial or formatted document sections, and images corresponding to a set of predefined control categories. The task of the classifier is to analyze the occurrence of such elements to determine whether the document contains a control event. This classification step provides an intelligent function based on a collective analysis of a large corpus of relevant publications that can optimize the possibility of finding a publication of interest by automatic means in order to save the time of the user and to improve the accuracy of the search. Further, in one embodiment of the present invention the classification method is a learning function that can improve the results of classification over time based on feedback. The classification step though cannot be carried out without the result of the master control program to identify what is new and to process the type of the publication.

A number of different classification methods are known and may be used. These include, but are not limited to, Bayesian Analysis, Inverse Term Frequency Analysis and other statistical methods that analyze the word content or other attributes of the publication document in order to assign the document to a particular control category. For example, in one embodiment, the database contains a list of word terms associated with a control category and the classifier application extracts and counts the occurrence of such words in the publication. Based on the classification method selected, an equation is applied to the cumulative frequencies of terms found in the document in order to produce a weighted score of whether the publication belongs to a control category. For example, in an Inverse Term Frequency Analysis, the occurrence of words strongly associated with a single category but weakly associated with all categories is given higher weight. Thus words like "regulation" may appear in all control categories of a set of documents that are published regulations. In contrast, words and phrases like "pesticide residues" would receive higher scores because they are associated with a limited set of control categories dealing with the control of contaminants in foods. However, some web sources of publications may be pre-classified a priori and any publications from such a highly specific web-site can be assigned to a particular control category.

In a preferred embodiment the classifier application running on a server computer connected to a database contains a collection of relevant terms together with their weighted scores, based on the analysis of a trained set of multilingual publications. Depending on the method of the analysis used, the occurrence of the terms in the document is calculated using the weighted scores associated with the terms found in the database. To determine the accuracy of the weighted terms for a given control category, one method is to randomly select a subset from among publications that have been previously assigned by manual or expert means. In such an example, the randomly selected test set of publications would be withheld from the training run of known documents. Then the classification of the random subset can be compared against the manual classification in order to determine whether the overall result is accurate.

The output of the classifier application is a determination that a publication is relevant to one or more pre-defined control categories and the automatic preparation of a summary report that is then loaded to the database of a server. An example of a control category would be: "Product Recalls". The information resulting from the classification process will, for example, include the determined control category and sub-categories, the citation, a hyperlink to the source document, and any summary statement.

In a preferred embodiment of the present invention, another classification step occurs in which a multi-lingual analysis of the document is made by an application program running on a server computer in order to identify any specific reference to a product, substance, food or foodstuff, biological agent, disease, and commodity. The application program uses an indexed database of multilingual terms that are sorted by a number of different methods that include but are not limited to an inverted order with the longest terms occurring first. A list of all found references relevant to goods and services is then added to the summary information about the publication determined from the previous classification step. In this preferred embodiment, any reference to "acetic acid" or "strawberry" would, for example, be found. As a result, in the first classification step, information about the control category is determined, e.g., that FDA has published a proposed change in the regulation of sanitizing solutions in food processing equipment, which is assigned to a control category, "food contact", and that the proposed regulation applies to solutions containing "acetic acid". Thus, the present invention provides for a system and method to automatically discover and assign a control event or categorization to the newly published document and to analyze which product, substance, food or foodstuff, biological agent, disease, and commodity it might apply to in a multi-lingual manner without geographic limitation.

On the basis of the output reports stored within the web-based content management system, a centralized information system can be provided to subscribers within the supply chain or other interested parties.

According to a further feature of the invention, the output reports are structured in such a manner, using one or more protocols to format the information, so that the information may be loaded as data into an enterprise resource planning system (ERP), such as SAP, Oracle, or similar system. This would also apply to other specialized product life cycle management systems (PLM) or report generation systems used for product control. For example, a set of control events or categories can be associated with standard phrases that can be loaded into the enterprise system which can then be associated with reports to be generated from the enterprise system or transactions to be controlled by the enterprise system. The control event or information signal may be output from the centralized information service of the present invention and transmitted to the enterprise system in a number of different ways. The enterprise system can receive and consume the control event that can be passed using a structured information protocol, such as XML or as a web-service, or by a number of different methods. Such methods also permit customization of the information service and the mapping of the control events to the needs of the user of the enterprise system.

The output of the preferred embodiment includes the structured identification of one or more products, substances, foods or foodstuffs, biological agents, diseases, and commodities to which a document may apply. Further, the output of the preferred embodiment includes a control event associated with the document. These can be loaded as alerts to facilitate transaction control by the enterprise system. Thus the present invention provides a system and method to reduce the amount of time between the publication of a new or proposed law, regulation, standard, study, guideline, finding, health alert, product recall, governmental, commercial, or advisory announcement and the capability for an expert subscribing to the information service offered by the invention to act and, in addition, the capability for a subscribing enterprise system to load early warning signals for transaction control in a business-to-business exchange of information using any one of a number of data exchange protocols.

Other objects, advantages and novel features of the present invention will become apparent from the following detailed description when considered in conjunction with the accompanying drawings.

BRIEF DESCRIPTION OF THE DRAWINGS

FIG. 3 is an example illustration of output of a classifier application in accordance with an embodiment of the present invention.

FIG. 4 is an example illustration of results of extraction by the information system in accordance with an embodiment of the present invention.

FIG. 5 is an example illustration of hyperlinking to a source page by the information system in accordance with an embodiment of the present invention.

FIG. 6 is an example illustration of the master control program steps in accordance with an embodiment of the present invention.

FIG. 9 is an example illustration of the content management system steps in accordance with an embodiment of the present invention.

FIG. 10 is an example illustration of a user receiving system for a transmitted control event in a business-to-business exchange with an embodiment of the present invention.

FIG. 11 is an example illustration of a collection of pre-classified publications associated with control events in an embodiment of the present invention.

FIG. 14 is an example records of a database of terms statistically associated with control events in an embodiment of the present invention.

FIG. 15 is an example search using a major search engine, Google™, to find an example publication.

FIG. 16 is an example set of results for a classification of an example publication in one embodiment of the present invention.

DETAILED DESCRIPTION OF THE INVENTION

Figure 1:
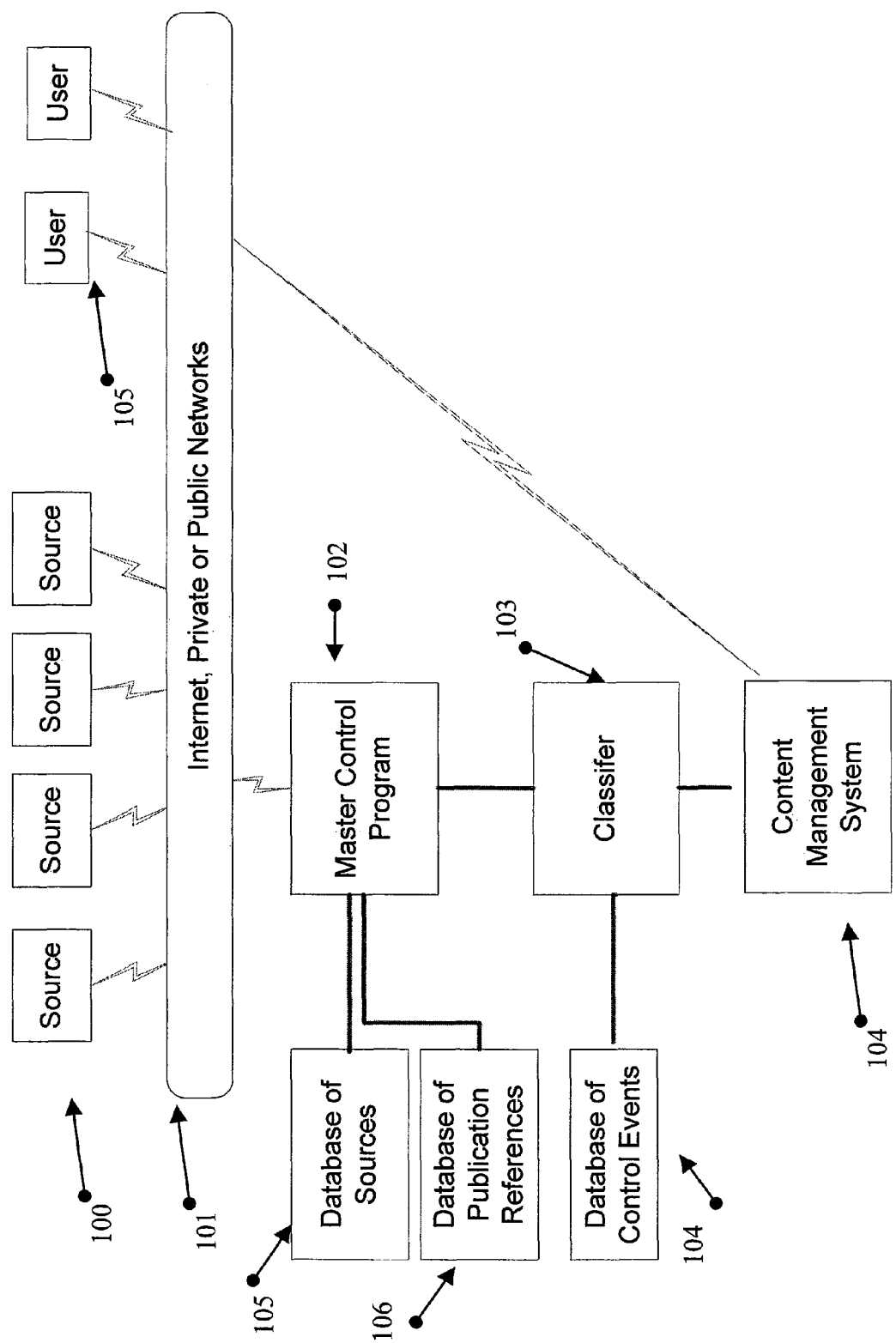
FIG. 1 is a block diagram of elements of an embodiment of the present invention.

Referring to FIG. 1, the system is composed of a number of elements. The first element is the source of information containing the publications to be analyzed. The sources of information 100 include but are not limited to: web-sites, an input source database library of documents, or files resident on a network. These are accessed by the applications of the present invention running on a computer server processor via one of the Internet, a private and public network 101. As illustrated in network 101 the ultimate users and the sources of the publications may be all on the Internet or on different networks. The sources of the publications may also be obtained from another provider of an information service or aggregator rather than obtained directly.

Figure 2:
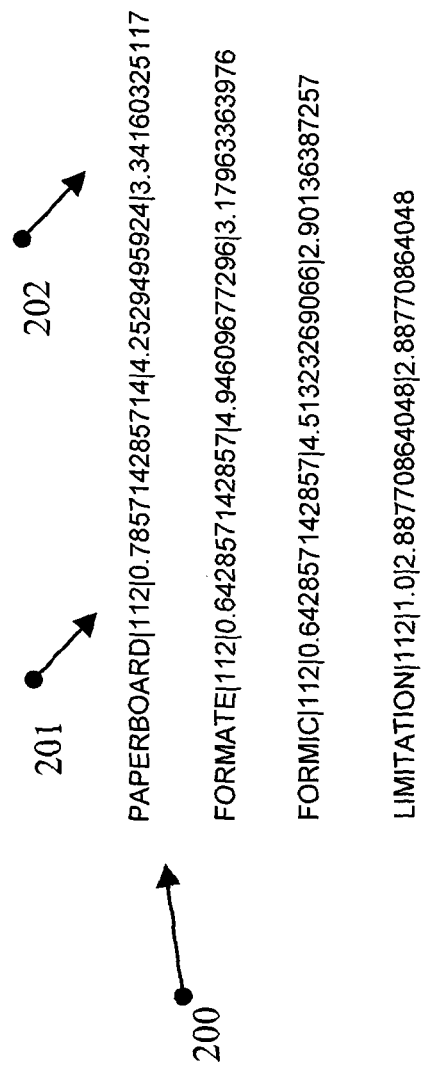
FIG. 2 is an example illustration of a word terms database content in accordance with an embodiment of the present invention.

The Master Control Program 102 running on a computer server processor polls each source of information 100 from a database of identified sources 105 to determine the publications to be analyzed by the classifier and their type. Alternatively, the publications and references can be provided by another information provider or aggregator. References to publications found are stored in a database 106. The candidate publications are submitted to a classifier application running on a server computer 103 connected to a database containing document elements, associated control events, and any weighting data, rules, or functions to be called during the classification 104. For example, referring to FIG. 2, one embodiment of the application includes a database of word terms 200 that are associated with key codes 201 representing control events that are given weighted scores 202. In the example of FIG. 2, several word terms are given that are associated with the control event or category of "food contact with paper or paperboard," which has been given the identification number 112, In the example, these word terms include "paperboard", "formate", "formic" and "limitation." Such terms can be in any language. Further, the document elements used in the classification process include word terms, fragments, URL references, phrases, spatial or formatted document sections, and images. The task of the classifier is to analyze the occurrence of such elements to determine whether the document contains a control event using the classification method selected. In this example, if the classification program running on the server apparatus scans the words in the document and finds the word "paperboard" in the publication then the relevant weighted score is given to the calculation of whether a control event has been detected. Thresholds may be defined to filter out false positives and false negatives. As mentioned, a number of different classification methods to accomplish the classification are known to those of ordinary skill in the art.

The output of the classifier application is a determination that a publication is relevant to one or more pre-defined control categories and the automatic preparation of a summary report that is then loaded to the content management system 104. Referring to FIG. 3, an example of this output is given. At 301 the general categories of control events are provided by the information service, in this case covering the areas of product safety and food and consumer products. A particular control event has been passed to the information system running on a server processor at 300. In this case, it is an indication that the European Chemicals Agency (ECHA) has received new nominations of chemicals deemed to be of high hazard potential. The control event has been categorized at 302.

FIG. 4 illustrates results of the extraction by the information system from the document chemicals identified in the underlying document. FIG. 5 illustrates the provision of a hyperlink to the source page by the information system of this embodiment.

The output of the preferred embodiment includes the structured identification of one or more products, substances, foods or foodstuffs, biological agents, diseases, and commodities to which a document may apply. Further, the output of the preferred embodiment includes a control event associated with the document. These can be loaded as alerts to facilitate transaction control by the enterprise system. Thus the present invention provides a system and method to reduce the amount of time between the publication of a new or proposed law, regulation, standard, study, guideline, finding, health alert, product recall, governmental, commercial, or advisory announcement and the capability for an expert subscribing to the information service offered by the invention to act and, in addition, the capability for a subscribing enterprise system to load early warning signals for transaction control in a business-to-business exchange of information using any one of a number of data exchange protocols.

An example is illustrated with FIGS. 11-17. A database of control events 104 is populated so that the Classifier application 103 can operate. One way to accomplish this is to use a collection of documents with known control events. Referring to FIG. 11, in an embodiment of the present invention, a collection of documents is obtained in which whatever control events applicable to each publication have been pre-classified by methods that include, but are not limited to, the following: a) the collection may be manually classified by a human expert; b) one or more key words may be used to identify an initial set of publications from which other publications can be inferred by examining referenced citations or other page links on the page; c) publications of interest may be inferred by the patterns of user searches of users known to have interest in a control event from an analysis of the usage logs of a search engine, and from this set of terms the initial set of publications is made; and d) a predefined library of publications can be obtained. The relevant control events are defined for the initial set of publications, for example, the country 1100, region 1101, citation 1102, and a set of control categories 1103, such as product safety, dangerous & toxic substances, sub-category pesticides.

A method is selected to populate the database of control events 104 with attributes that would include but not be limited to the document element and its associated control event. The methods may include, but are not limited to: a) manual entry of terms and weights; b) statistical methods, such as Bayesian analysis and inverse term frequency analysis; c) citation matching; and d) ranking methods, such as URL cross-referencing. FIG. 14 illustrates one embodiment of the present invention where word fragments have been associated with statistical weights that are then used to calculate whether the occurrence of these terms found in a candidate publication results in a classification of the publication into a particular control category. In FIG. 14, the terms extracted are associated with control events related to the publication of product safety restrictions for dangerous and toxic substances that are pesticides.

Figure 12:
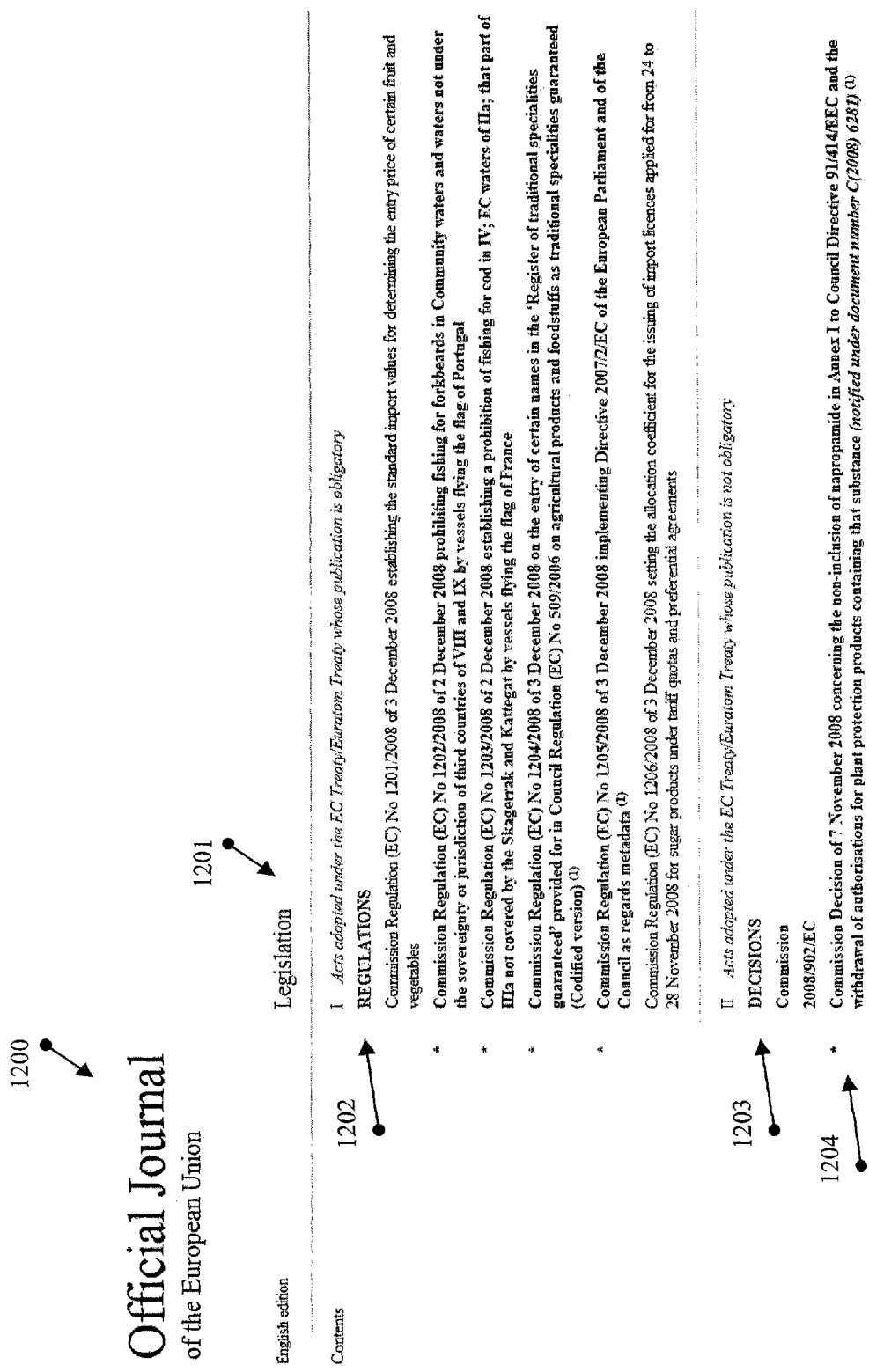
FIG. 12 is an example illustration of a publication associated with a significant control event.

FIG. 12 illustrates an example of an electronic publication found on a governmental web-site source to be investigated by the Master Control Program 102. In particular, the European Union publishes its *Official Journal* on a daily basis and is reviewed by many thousands of users on a daily basis to find out whether an important action has been made. In this instance, the web-site of the European Union can have many different publications that change daily, and further, the *Official Journal* may publish legislation 1201, regulations 1202, and decisions 1203. In order for the Classifier 103 to perform its function, the Master Control program 102 must analyze the various publications available on the web-site and determine whether the publication is new and whether it is relevant to classification, for example, by distinguishing the type of action if possible from legislation, regulations, decisions, and notices.

Figure 13:
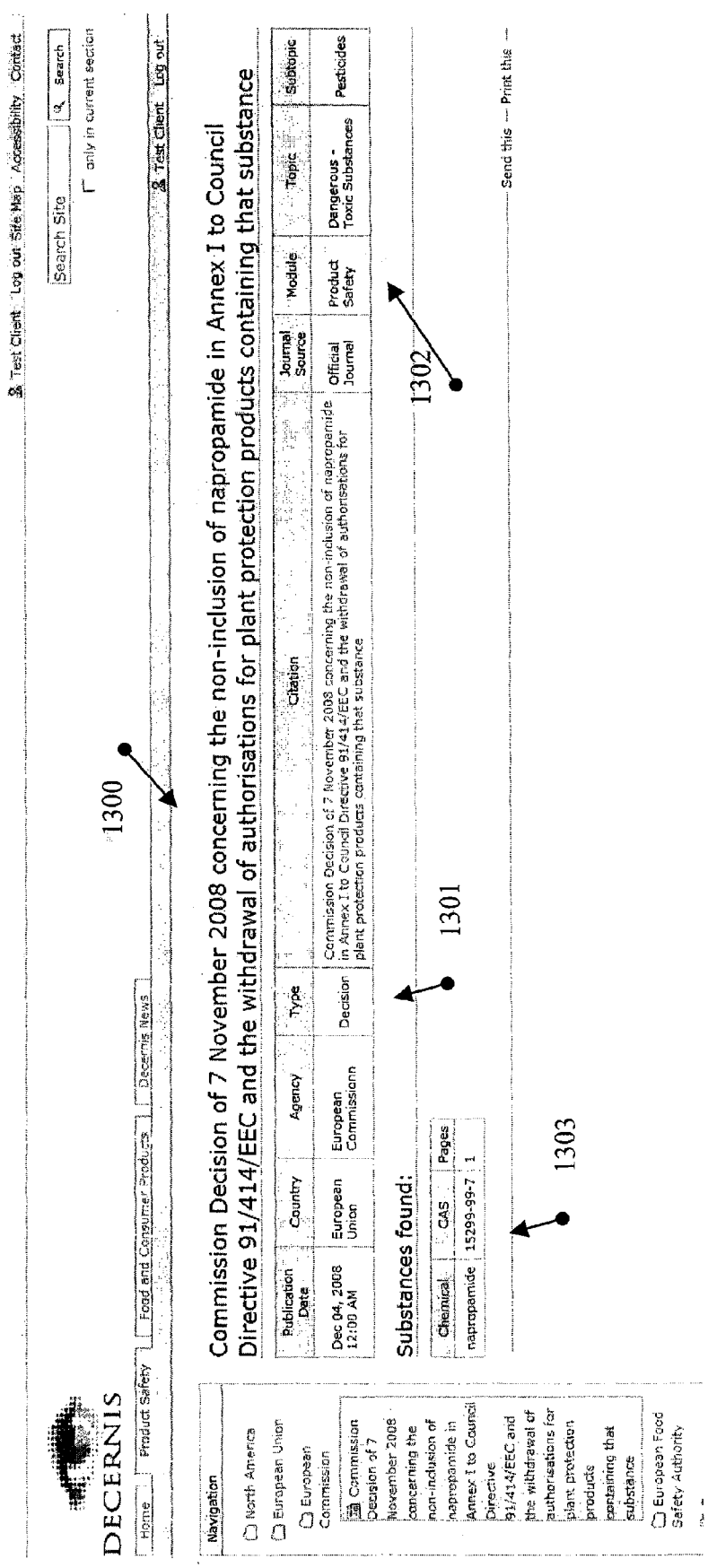
FIG. 13 is an example user screen illustrating a control event and an associated publication in an embodiment of the present invention.
Figure 15:
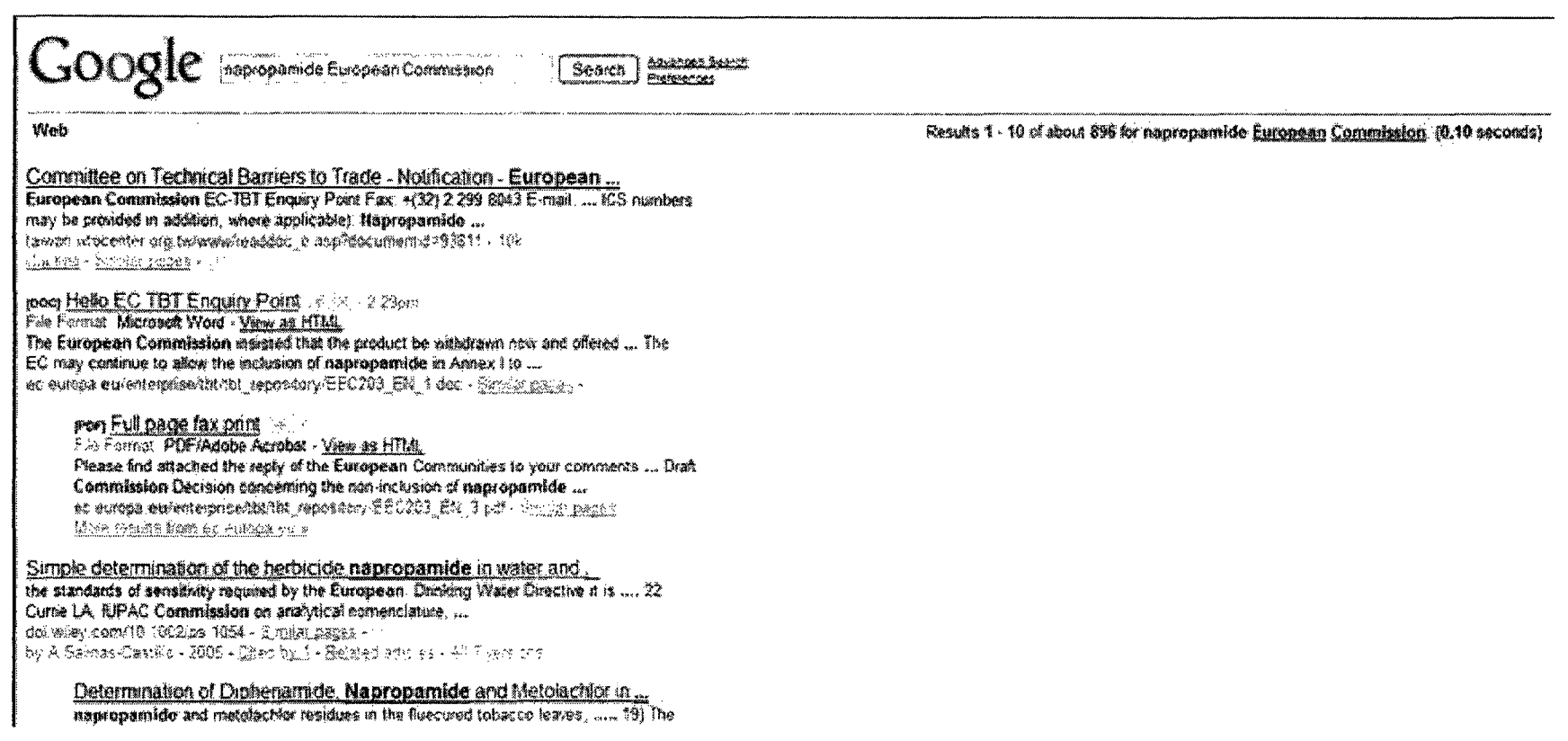

In the noted instance illustrated by FIG. 13, the European Union has published a decision: "Commission Decision of 7 Nov. 2008 concerning the non-inclusion of napropamide in Annex I to Council Directive 91/414/EEC and the withdrawal of authorisations for plant protection products containing that substance" 2008/902/EC. Indeed, this is a significant control event because among other measures, the Commission has decided that Member States of the EU must ensure that no authorizations for plant protection products containing napropamide may be granted or renewed from the date of the decision. It also establishes a schedule for the withdrawal of authorizations for pesticides containing napropamide. Any manufacturer, distributor, governmental official, and member of the public concerned with these products would want to be informed as soon as possible of this action. However, referring to FIG. 15, a search a day following publication in major search engine, Google™, illustrates that even a narrow search for "napropamide European Union" returns a large number of document (896) and does not rank this publication highly. As a result, it would be a publication easily missed even by a user employing very narrow search terms. In contrast, this publication was identified by the present invention the same day.

Figure 17:
FIG. 17 is the output of the classification application for an example series of publications in one embodiment of the present invention.

In an example of an embodiment of the present invention, once the Master Control Program 102 discovers by the running of the application on the computer server accessing a web site source that the EU decision is a new publication and has categorized its control type, i.e., that it is a "decision", the publication is passed to the Classifier application running on a computer 103. One embodiment of the running of the Classifier application is illustrated in FIG. 16. The database field key reference to the EU decision passed by the Master Control Program is "dec_2008_902_2.txt" 1600. The control category event database key code identified by the Classifier is then provided 1601. In this case, the database key associated with the control event for product safety restrictions for dangerous and toxic substances that are pesticides is "245". The use of standard control codes makes it possible in one embodiment of the present invention to pass control events in different languages as standard phrases that may be translated into many languages. In the particular method of analysis selected and illustrated in FIG. 16, a number of possible categories 1601 were evaluated by the Classifier application for this publication, "165", "260", "142", etc. However, it can be seen that there are many occurrences found that correspond to control event "245". Although the classification method in this case is a statistical one based on word frequencies in a publication, there are a number of alternative methods that may be used, as indicated. The output of the Classifier is illustrated in FIG. 17 and the classification step discovers a control event "245" for this publication, product safety restrictions for dangerous and toxic substances that are pesticides and the type of the control event discovered by the Master Control Program is a decision of the European Commission.

A preferred embodiment of the present invention includes a separate classification step in which a product, substance, food or foodstuff, biological agent, disease, and commodity is indexed within the publication by one or more methods. A further embodiment indexes any broad concept and commercial information within the publication. Such indexing includes references and identification system in common use by supply chains, for example, GS1 Global Registry® and other data synchronization networks that are designed to facilitation of communication by trading partners. Further, indexing can be associated with particular shipments of a particular product to facilitate tracking, traceability and product recalls in relation to a control event that might apply to particular shipments. To do so permits the user to relate a control event applicable to a component part to an article or which is important to the user in some way, for example, in the consideration of alternative products and ingredients. In this case, the indexing step for the separate classification discovers that the substance referred to by the EU has the CAS RN of "15299-99-7" using a common identifier for chemical substances. As a result of this identification, it becomes possible for the user of information system to use other methods of identification that permit the user to search for and obtain the publication of interest. Associated terms may not be simply identifiers; they may also be translations into another language or synonymous references. Such synonyms and translated terms in this case include:

a. 15299-99-7 2-(α-naphthoxy)-n,n-diethylpropionamide
b. 15299-99-7 N,N-Diaethyl-2-(α-naphthoxy)-propionamid
c. 15299-99-7 N,N-Diethyl-2-(1-naphthalenyloxy)propionamide
d. 15299-99-7 Napropamid e. 15299-99-7 Napropamida
f. 15299-99-7 Napropamide
g. 15299-99-7 Napropamide, N,N-diethyl-2-(1-naphthyloxy) propionamide
h. 15299-99-7 Propanamide, N,N-diethyl-2-(1-naphthalenyloxy)

An illustration of one embodiment of this separate classification step is illustrated in FIG. 13. By including this separate classification step, a number of customized and value-added services 1303 can be provided that include but are not limited to: a) An identification of the manufacturers and distributors affected can be provided by a linked search using the identifier, b) a listing of the user's products that contain the substance as an ingredient, c) other functional or transaction control steps can be invoked based on this early alert to the publication of a control event, such as whether a product recall is to be issued and whether management is to be informed, d) an information signal passed to a supply chain management service and data network, and e) an information signal passed into an enterprise system, such as that illustrated in FIG. 10.

The output of the Classifier application 103 is passed to the Content Management System 104, and for the example, above, this is illustrated in FIG. 13. The citation is provided 1300 and the type of control event discovered by the Master Control Program is a "decision" 1301. The English language version of the standard control event is illustrated at 1302.

In this example, the discovery of a significant publication has been illustrated by one embodiment of the present invention. This example also illustrates the limitations of present searching methods and clipping information services that are improved by the use of the present invention to optimize the possibilities that the user will learn of a control event represented by a publication that can be associated with a critical control point in the production of a good or service. Further, the customized services that become possible on the basis of the present invention add value to and improve the quality of control processes of the user.

The Master Control Program 102 carries out a series of steps illustrated in FIG. 6. For each source of publications contained in the database of sources 105, the first step is to access the source that may be accomplished by but is not limited to the following: A web-site, network node, a web-service request, an automatic procedure interface (API), a remote procedure call (RPC) or a file 600. Information is fetched from the source 601 into the memory of the computer apparatus. At this point, the Master Control Program extracts references to any publications found in the information 602. These references are saved together with any extracted descriptive information, such as title, source, and date. A determination is then made whether the reference to the publication extracted from the downloaded information is already contained in the Database of Publication References 106. If the publication reference is new it is submitted to the Classifier 103. If not, the Master Control Program continues to the next publication reference. In addition, the Master Control Program determines the source and the type of the publication, which may include but not be limited to: whether it is legislation, regulation, or a notice and whether proposed or final.

Figure 7:
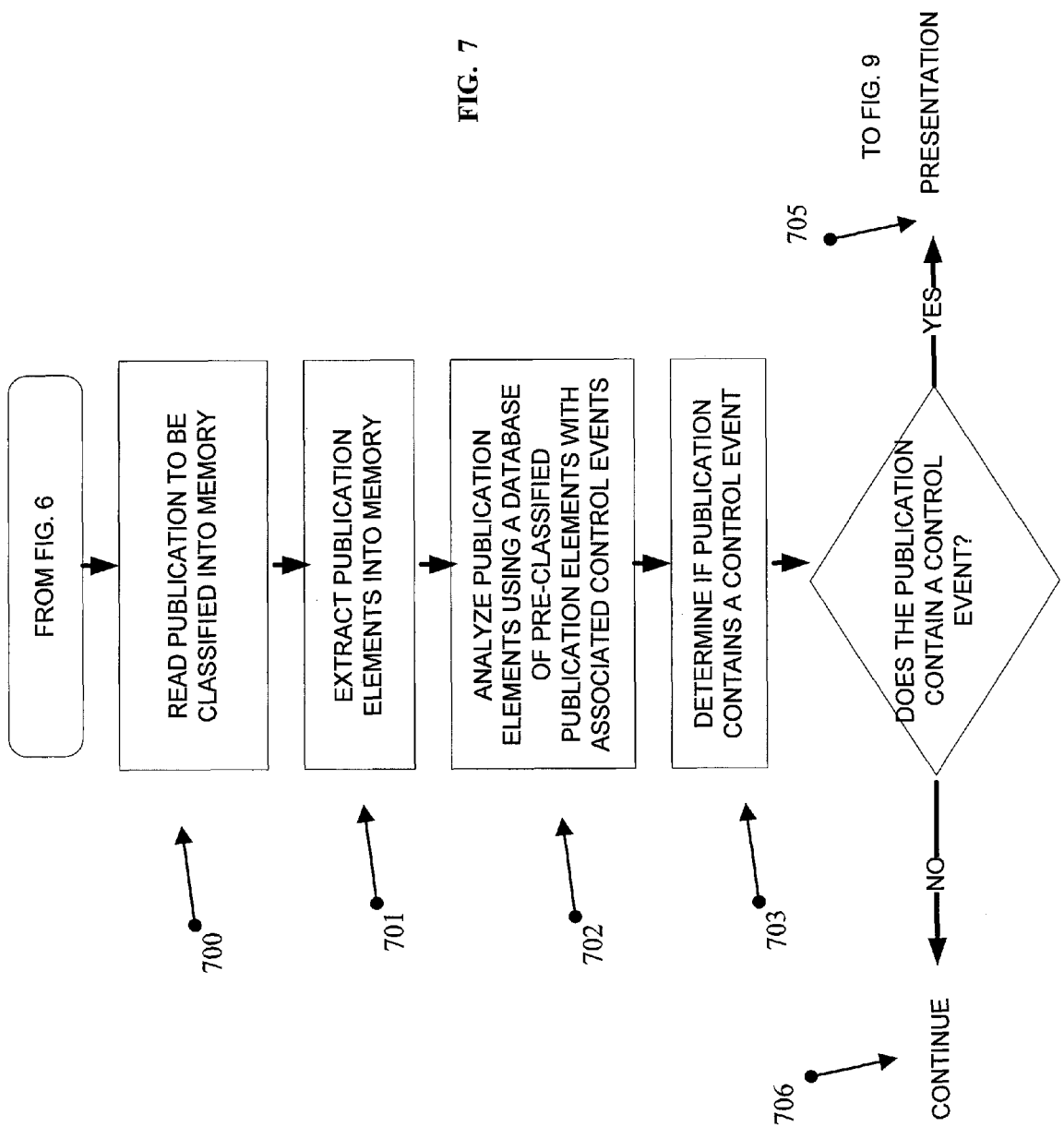
FIG. 7 is an example illustration of the classification steps to discover control events within a publication in accordance with an embodiment of the present invention.

The classification step is illustrated in FIG. 7. The classification begins with the reading of the publication into the memory of the computer 700. The elements of the publication are extracted 701. As indicated, the elements used in the classification step of a publication may include but are not limited to include word terms, fragments, URL references, phrases, spatial or formatted document sections, and images.

The elements extracted are related to one of a plurality of possible classification methods. An analysis 702 of the publication then occurs to find elements within the publication that match a database of pre-classified elements that are associated with control events. For example, if the method of classification used is an Inverse Term Frequency, then the elements extracted are words and the database contains the weighted scores to be used in the classification analysis based on the frequency of occurrence of each such word found in the publication. The analysis within the application running on the computer apparatus produces a conclusion that the publication is or is not classified as one containing a control event 703. If the conclusion from the application is that a control event exists, it is passed to the content management system. If not, the application continues with the next publication to classify until an end to the queue of publications or until stopped.

Figure 8:
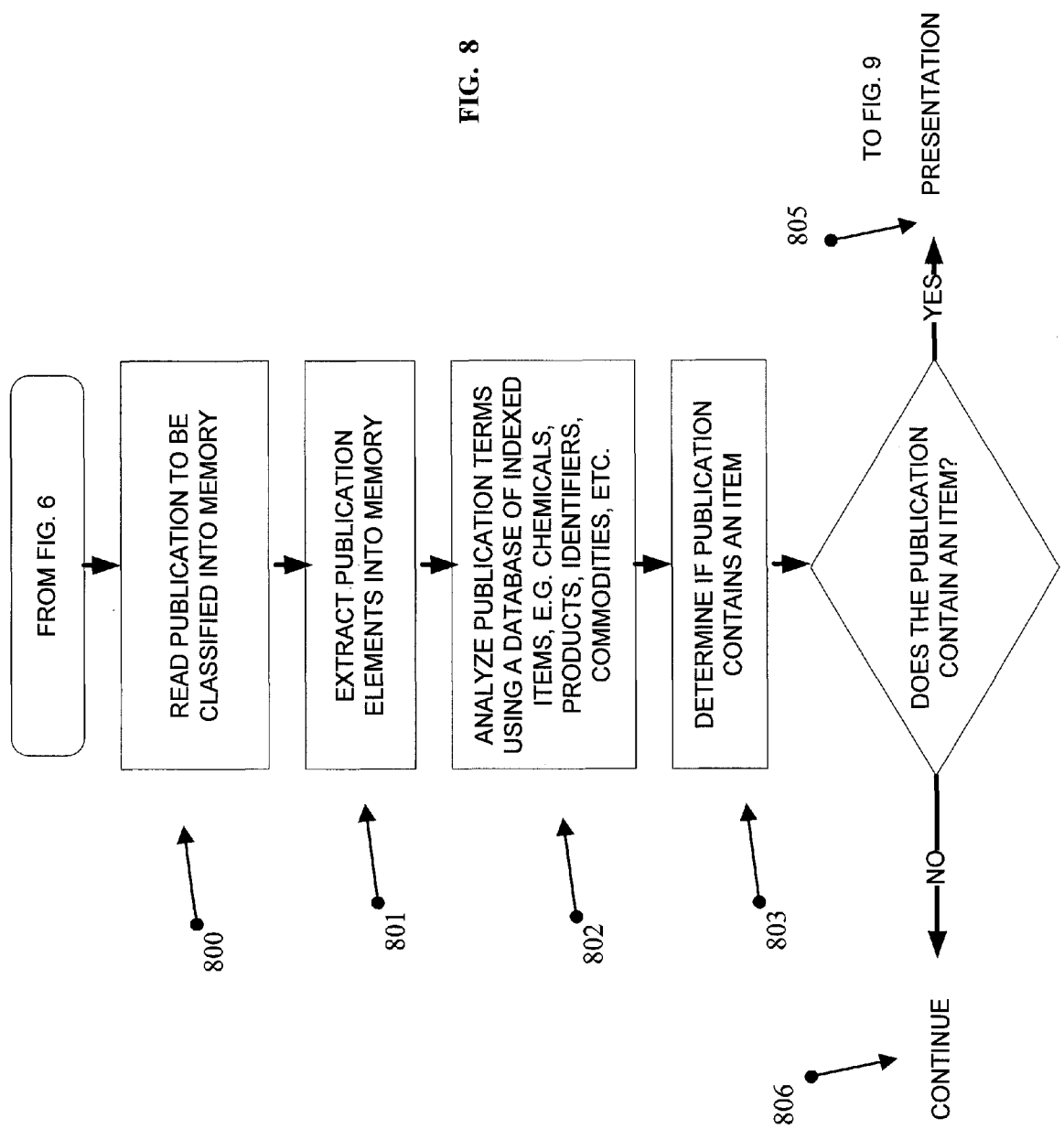
FIG. 8 is an example illustration of a preferred embodiment of the present invention where the classification steps are to discover items within a publication.

Referring to FIG. 8, in a preferred embodiment of the invention, another classification is made by an application running on the computer apparatus in order to identify whether the publication contains an item of interest. As used in this invention, an item may be a chemical, product, product identifier, biological agent, commodity, disease, citation, transaction code, RFID code, institute, governmental agency, manufacturer, processor, and distributor. In order to classify the publication whether it contains an item of interest, it is received and read into the memory of the computer running the application 800. The elements of the publication are extracted and parsed 802. The elements are compared against an indexed database of items. This comparison may be accomplished in one of a plurality of methods, which include but are not limited to a simple look-up of a candidate item in a database of known items and an analysis using an algorithm to discover an item. For example, if the search is for a chemical item and the selected method of analysis is using word fragments, then an inverted index using the longest terms first can be used to successfully identify a chemical item. If the word fragments are "sodium" followed by "chromate" then an inverted index comparing sodium chromate first followed by sodium is necessary to avoid the false classification that the publication contains the items "sodium" and "chromate" when it refers to "sodium chromate". With the method of analysis selected all items are extracted from the publication. The application running the classification makes a determination based on the method of analysis selected that the publication contains an item 803. If the conclusion from the application is that an item exists within the publication, it is passed to the content management system. If not, the application continues with the next publication to classify until an end to the queue of publications or until stopped.

Classification of items permits a user of the information service can receive an alert that a control event has occurred in the first classification step and that it applies to an item being produced, manufactured, or otherwise of interest in the second classification step. For example, FIG. 3 illustrates the discovery, using the classification methods described, of a control event 300, which is that the European Chemicals Agency has received a nomination to list a chemical under REACH Annex XV, which is a process in the European Union for registration and evaluation of chemicals and that this represents a control event described within the control categories of Product Safety, Dangerous and Toxic Substances, and the sub-category, REACH 302. Referring to FIG. 4, which is a detailed view of the control event, a list of items is illustrated which come from the item classification step. In this example, the items are chemicals. "Coal tar pitch" with an identifier is listed 400. FIG. 5 illustrates the display of the publication based on the click of a hyperlink, which is available as part of the publication attributes extracted and provided to the content management system. In this case, "coal tar pitch" has indeed been nominated by the European Union as a chemical of significant or very high concern under REACH but that the identifier given is an "EC number", which may not be readily available to some users. In the preferred embodiment the items classified within the publication are associated with identifiers that may be used within the user's local business process or in a supply chain information service. There are many such standard identifiers and a customized information service based on the invention would provide the facility to associate such an item with a user-defined identifier and with any product, good, service, and process to which the item belongs. For example, a customized information service would map the standard identifiers available in the database to the user's identifiers that might include but are not limited to: Part numbers, product codes for products containing the item as a component or raw material, supplier or customer information, and RFID or other bar-codes codes associated with an individual shipment.

Referring the FIG. 9, the classified publications are provided from the previous classification to a content management system running as an application on a computer 104. The classification may be of a control event 900 and in the preferred embodiment, a classification of items 906. The information passed by the classification step is indexed and stored 901. A user request may then be received 902. A user may be but is not limited to: a human being accessing the information service via a personal computer over the Internet, Intranet, or other network; a business-to-business request from another system using a remote procedure call (RPC), web-service request, or the passage of structured content, for example, through a protocol such as XML; and another information service, information aggregator, and supply chain information service. The type of request received and any authorization necessary is then carried out 902. In one embodiment of the present apparatus and method, the user creates a customized information service by requesting that any response be filtered according to a defined set of parameters provided by the information service. For example, the information service could permit customization by allowing the user to select particular control events and items of interest. The content management system responds with the information stored about the control event discovered and references to the publication 904 and returns a response to the user 905.

Where the user is another system in a business-to-business exchange, the control event must be consumed by the user system through a receiving step, an example of which is illustrated in FIG. 10. Many such receiving steps are possible and the illustration refers to only one embodiment. The control event and any associated items with available identifiers are received by the user system 1000. This is equivalent to a motor receiving a signal over a network, but in this case it is a system that is part of a business or manufacturing process receiving a control event. The identifier given, which may be but is not limited to a part number, product code, CAS registry number, EC number, shipment number, and citation. The user's system analyzes the identifiers and control event codes given against one or more databases containing the user's identifiers and control event codes. The control codes may be provided as standard phrases that are part of a standard library of control events in order to provide consistency of information and use by the user and any actor in a supply chain for a good or service. The user system then determines whether the control event or the identifier is of interest by manual or systematic means. If the control event is associated with an item of interest the user takes action to control a transaction or process 1005. If not, the user's process stops or waits for the next received signal 1006.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for discovering a control event from electronically published documents, comprising:

populating a user interest database with at least one of geographic and subject matter identifiers associated with interests of at least one user of electronically published documents;

accessing electronically published documents stored on a plurality of network servers;

operating a control program on a computer to identify documents among the electronically published documents stored in the plurality of network servers which potentially contain control events, wherein the control program identifies the documents which potentially contain control events by reference to the user interest database;

storing a copy of the documents identified as potentially containing control events in a local storage device accessible by a classification program operating on the computer;

providing a control event database of classified control events relevant to the control of at least one of goods and services;

operating the classification program to determine whether at least one of the classified control events is present in the stored documents identified as potentially containing control events, wherein the classification program determines whether the at least one of the classified control events is present by reference to the control event database;

assigning at least one control event classification to the stored documents identified as potentially containing control events which are determined to contain at least one discovered control event;

storing the assigned at least one control event classification and information identifying the stored document to which the at least one control event classification is assigned in a classification database;

creating a report of discovery of at least one of the stored documents determined to contain control events to at least one user, wherein the report is created by reference to the user interest database and the stored assigned control event classifications, and the report includes at least one link to at least one of the stored control event classifications and its associated stored document determined to contain at least one discovered control event; and delivering the report to the at least one user.

2. The method of claim 1, wherein the control program identifies the documents which potentially contain control events by at least one of examination of document text, examination of document publication dates, and application of a publication selection algorithm using predetermined document selection criteria.

3. The method of claim 1, wherein
the classification program determines whether control events are present in the stored documents by at least one of Bayesian Analysis, Inverse Term Frequency Analysis, and a statistical classification method which evaluates the cumulative frequency of terms identified using a weighted scoring based on a predetermined set of words and phrases associated with control events.

4. The method of claim 1, wherein
the database of classified control events relevant to the control of at least one of goods and services includes classified control events pertaining to discovery of at least one of a chemical, biological agent, disease, food, food ingredient, material, product and service control event.

5. The method of claim 1, wherein
the classification program determination of whether control events are present is multi-lingual.

6. The method of claim 1, wherein
at least one of the database of classified control events and the control event classification includes user-defined control events corresponding to a scope of control events of interest of at least one individual user, and
reports forwarded to the at least one individual user contain only information on discovered control events and documents within the scope of control events of interest defined by the at least one individual user.

7. The method of claim 1, wherein
the reports of discovery of documents containing control events are transmitted to a client enterprise control application which receives the reports and integrates information in the reports into an information management system of at least one user.

8. The method of claim 5, wherein
at least one of the at least one individual user is a producer of a good or service, and
the at least one individual user's enterprise control application is programmed to permit the at least one individual user to customize the presentation of received information about control events and discovered documents relevant to the producer's individual products and processes.

9. The method of claim 1, further comprising:
automatically generating and storing an index and a summary of the one or more retrieved documents containing at least one discovered control event.

10. The method of claim 1, further comprising:
searching in response to a request from the at least one user for any discovered control event associated with chemical, biological agent, disease, food, food ingredient, material, product and service within the at least one user's scope of interest.

11. The method of claim 10, wherein
the search is conducted using at least one of a synonym, translation or aggregated concept related to the control event.

12. An apparatus for discovery of information containing control events from electronically published documents, the apparatus comprising:
a computer including a processor and memory;
a non-transitory user interest database on a computer-readable storage medium populated with at least one of geographic and subject matter identifiers associated with interests of at least one user of electronically published documents;
a non-transitory control program on a computer-readable storage medium, the control program comprising computer code executable on the computer for identifying documents among electronically published documents stored in a plurality of network servers which potentially contain control events, wherein the control program identifies the documents which potentially contain control events by reference to the user interest database;
an electronically published document storage device, the storage device being arranged to store a copy of the documents identified as potentially containing control events;
a non-transitory control event database on a computer-readable storage medium containing classified control events relevant to the control of at least one of goods and services;
a non-transitory classification program on a computer-readable storage medium, the classification program comprising computer code executable on the computer for determining whether at least one of the classified control events is present in the stored documents identified as potentially containing control events and
a non-transitory storing program on a computer-readable storage medium, the storing program comprising computer code executable on the computer for storing the at least one assigned control event classification and information identifying the stored document to which the at least one control event classification is assigned; and
a non-transitory discovered document reporting program on a computer-readable storage medium, the discovered document reporting program comprising computer code executable on the computer for creating a report of discovery of at least one of the stored documents determined to contain control events to at least one user and delivering the report to the at least one user, wherein the report is created by the discovered document reporting program executed on the computer by reference to the user interest database and the stored assigned control event classifications, and the report includes at least one link to at least one of the stored control event classifications and its associated stored document determined to contain at least one discovered control event.

13. The apparatus of claim 12, wherein
the control program identifies documents which potentially contain control events by at least one of examination of document text, examination of document publication dates, and application of a publication selection algorithm using predetermined document selection criteria.

14. The apparatus of claim 12, wherein
the classification program determines whether control events are present in the stored documents by at least one of Bayesian Analysis, Inverse Term Frequency Analysis, and a statistical classification method which evaluates the cumulative frequency of terms identified using a weighted scoring based on a predetermined set of words and phrases associated with control events.

15. The apparatus of claim 12, wherein
the database of classified control events relevant to the control of at least one of goods and services includes classified control events pertaining to discovery of at least one of a chemical, biological agent, disease, food, food ingredient, material, product and service control event.

16. The apparatus of claim 12, wherein
the classification program determination of whether control events are present is multi-lingual.

17. The apparatus of claim 12, wherein
at least one of the database of classified control events and the control event classification includes user-defined control events corresponding to a scope of control events of interest of at least one individual user, and
reports forwarded to the at least one individual user contain only information on discovered control events and documents within the scope of control events of interest defined by the at least one individual user.

18. The apparatus of claim 17, wherein at least one of the at least one individual user is a producer of a good or service, the computer system further comprising:
an enterprise control program on a computer-readable storage medium, the enterprise control program comprising computer code for permitting the at least one individual user to customize the presentation of received information about control events and discovered documents relevant to the producer's individual products and processes.

19. The apparatus of claim 12, further comprising:
an indexing and summary program on a computer-readable storage medium, the indexing and summary program comprising computer code for automatically generating and storing an index and a summary of the one or more retrieved documents containing at least one discovered control event.

20. The apparatus of claim 10, further comprising:
a search program on a computer-readable storage medium, the search program comprising computer code for searching in response to a request from the at least one user for any discovered control event associated with chemical, biological agent, disease, food, food ingredient, material, product and service within the at least one user's scope of interest.

* * * * *